(12) United States Patent
AlHarbi et al.

(10) Patent No.: US 9,251,373 B2
(45) Date of Patent: Feb. 2, 2016

(54) PREVENTING STACK BUFFER OVERFLOW ATTACKS

(71) Applicants: Northern Borders University, Arar, Northern Borders Province (SA); Khalid Nawaf AlHarbi, St. Manamah (SA); Xiaodong Lin, Waterloo (CA)

(72) Inventors: Khalid Nawaf AlHarbi, St. Manamah (SA); Xiaodong Lin, Waterloo (CA)

( * ) Notice: Subject to any disclaimer, the term of this patent is extended or adjusted under 35 U.S.C. 154(b) by 77 days.

(21) Appl. No.: 13/804,056

(22) Filed: Mar. 14, 2013

(65) Prior Publication Data

US 2014/0283088 A1     Sep. 18, 2014

(30) Foreign Application Priority Data

Mar. 13, 2013   (CA) .................................... 2809516

(51) Int. Cl.
*G06F 21/00* (2013.01)
*G06F 21/64* (2013.01)
*G06F 21/52* (2013.01)

(52) U.S. Cl.
CPC ................ *G06F 21/64* (2013.01); *G06F 21/52* (2013.01)

(58) Field of Classification Search
CPC ............................... G06F 21/566; G06F 21/52
USPC ........................................................ 726/26
See application file for complete search history.

(56) References Cited

U.S. PATENT DOCUMENTS

| | | | |
|---|---|---|---|
| 4,878,221 A | 10/1989 | Shimada | |
| 5,835,958 A * | 11/1998 | Long et al. | 711/170 |
| 6,044,419 A | 3/2000 | Hayek | |
| 6,301,699 B1 | 10/2001 | Hollander | |
| 6,351,780 B1 | 2/2002 | Ecclesine | |
| 6,456,399 B1 | 9/2002 | Ho | |
| 6,560,199 B1 | 5/2003 | Hoshino | |
| 6,578,094 B1 | 6/2003 | Moudgill | |
| 6,826,697 B1 | 11/2004 | Moran | |
| 6,907,068 B2 | 6/2005 | Segawa | |
| 7,086,088 B2 | 8/2006 | Narayanan | |
| 7,231,666 B2 | 6/2007 | Haugh | |

(Continued)

OTHER PUBLICATIONS

Kuperman et al., "Detection and Prevention of Stack Buffer Overflow Attacks, How to mitigate remote attacks that exploit buffer overflow vulnerabilities on the stack and enable attackers to take control of the program", Communications of the ACM, Nov. 2005, vol. 48, No. 11, pp. 51-56.

(Continued)

*Primary Examiner* — Izunna Okeke
*Assistant Examiner* — Bryan Wright
(74) *Attorney, Agent, or Firm* — Oppedahl Patent Law Firm LLC

(57) ABSTRACT

Improved buffer overflow protection for a computer function call stack is provided by placing a predetermined ShadowKEY value on a function's call stack frame and copying the ShadowKEY, a caller EBP, and a return pointer are pushed onto a duplicate stack. The prologue of the function may be modified for this purpose. The function epilogue is modified to compare the current values of the ShadowKEY, caller EBP, and the return pointer on the function stack to the copies stored on the duplicate stack. If they are not identical, an overflow is detected. The preserved copies of these values may be copied back to the function stack frame thereby enabling execution of the process to continue. A function prologue and epilogue may be modified during compilation of the program.

11 Claims, 4 Drawing Sheets

(56) References Cited

U.S. PATENT DOCUMENTS

| | | | |
|---|---|---|---|
| 7,251,735 B2 | 7/2007 | Howard | |
| 7,269,136 B2 | 9/2007 | Peacock | |
| 7,272,748 B1 | 9/2007 | Conover | |
| 7,328,323 B1 | 2/2008 | Conover | |
| 7,386,886 B1 | 6/2008 | Abrams | |
| 7,412,004 B2 | 8/2008 | Faller | |
| 7,475,220 B1 | 1/2009 | Hastings | |
| 7,562,391 B1 | 7/2009 | Nachenberg | |
| 7,581,089 B1* | 8/2009 | White | 712/242 |
| 7,581,748 B2 | 9/2009 | Reimers | |
| 7,631,249 B2 | 12/2009 | Borde | |
| 7,634,813 B2 | 12/2009 | Costa | |
| 7,650,640 B1 | 1/2010 | Levy | |
| 7,669,243 B2 | 2/2010 | Conti | |
| 7,730,322 B2 | 6/2010 | Johnson | |
| 7,793,349 B2 | 9/2010 | Abrams | |
| 7,814,333 B2 | 10/2010 | Choi | |
| 7,853,803 B2 | 12/2010 | Milliken | |
| 7,916,640 B1 | 3/2011 | Bishara | |
| 7,949,841 B2* | 5/2011 | Pattabiraman et al. | 711/162 |
| 8,078,851 B2 | 12/2011 | Chiou | |
| 8,510,596 B1* | 8/2013 | Gupta et al. | 714/15 |
| 2001/0013094 A1 | 8/2001 | Etoh | |
| 2003/0217277 A1* | 11/2003 | Narayanan | 713/187 |
| 2004/0133777 A1* | 7/2004 | Kiriansky et al. | 713/166 |
| 2004/0168078 A1 | 8/2004 | Brodley | |
| 2004/0255146 A1* | 12/2004 | Asher et al. | 713/200 |
| 2005/0010804 A1* | 1/2005 | Bruening et al. | 713/200 |
| 2005/0044292 A1* | 2/2005 | McKeen | G06F 21/52 710/51 |
| 2009/0249289 A1* | 10/2009 | Akritidis et al. | 717/108 |
| 2014/0096247 A1* | 4/2014 | Fischer | 726/23 |

OTHER PUBLICATIONS

C. Cowan, C. Pu, D. Maier, H. Hinton, J. Walpole, P. Bakke, S. Beattie, A. Grie, P.Wagle, and Q. Zhang, "Stackguard: Automatic adaptive detection and prevention of buffer-overflow attacks," in Proc. of the USENIX Security Symposium, Jan. 1998.

Gupta et al., "Dynamic Code Instrumentation to Detect and Recover from Return Address Corruption", WODA '06, May 23, 2006, Shanghai, China, pp. 65-71.

Brandon Bray, "Compiler Security Checks in Depth", http://msdn.microsoft.com/en-us/library/Aa290051, Feb. 2002, pp. 1-13.

MSDN Library, Considerations when Writing Prolog/Epilog Code, http://msdn.microsoft.com/en-us/library/t2wt9aez%28v=vs.71%29.aspx, retrieved on line Jan. 5, 2013, 3 pages.

MSDN Library, naked (C++), http://msdn.microsoft.com/en-us/library/h5w1Owxs%28v=vs.80%29.aspx, Visual Studio 2005, retrieved online Jan. 5, 2013, 3 pages.

Qiang Zeng. Dinghao Wu. Peng Liu, Cruiser: Concurrent Heap Buffer Overflow Monitoring Using Lock-free Data Structures, http://faculty.ist.psu.edu/wu/papers/cruiser-pldi2011.pdf, PLD'11, Jun. 4-8, 2011, San Jose California, pp. 367-377.

Dailey Paulson, Linda, "New Chips Stop Buffer Overflow Attacks", IEEE Computer, Oct. 2004, pp. 28-30.

Canadian Patent Application Serial No. 2,809,516; Office Action dated Sep. 15, 2015.

* cited by examiner

PREVENTING STACK BUFFER OVERFLOW ATTACKS

FIELD OF THE INVENTION

The present invention relates generally to the field of software security, and more particularly to stack buffer overflow detection.

BACKGROUND OF THE INVENTION

There is a continuing need to improve the security of computer applications and operating systems. More specifically, buffer overflow attacks remain a material threat to computer systems in view of the personal information theft and computer service disruption which occur when buffer overflow vulnerabilities are exploited.

Buffer overflow vulnerabilities can occur in an operating system or an application, whether on a client or server, or even in hardware such as in network devices. These vulnerabilities are often based on C/C++ programming languages or on components which have been derived or written in C/C++ languages, but in principle may exist in any software or hardware system having the essential characteristics giving rise to the vulnerability.

In general, a buffer overflow vulnerability exists when it is possible for a process or an application to write more data in a buffer than the buffer was designed to hold. If the process or application does not limit the data write to the predefined buffer address space, the excess data is written into other memory segments thereby overwriting and corrupting data saved into those segments. The excess data may include malicious code written in the machine language executable by the CPU, and may be configured to produce a shell prompt or other function according to the attacker's intentions. Where the buffer is a call stack buffer, the vulnerability may enable the attacker to disrupt or hijack application flow and inject and execute malicious code.

FIGS. 1A-1C illustrate a basic stack overflow attack. A known call stack 100 is shown in FIG. 1A having a call stack frame 103 for a function. The stack frame 103 has a parameters segment 110, a return address segment 120, a caller extender base pointer (EBP) segment 130, and a local variables segment 140. As shown, the stack grows downwardly toward lower memory addresses, while strings grow upwardly toward higher memory addresses, as is the case in the x86 family of instruction set architectures. Unless the associated function was called from a shell, a stack frame corresponding to the calling parent function will have been placed above this child function's frame on the stack, as indicated.

As is known, the parameters segment 110 stores parameters passed from the caller. A pointer to the branch point in memory of the execution code of a parent function following the call to the child function is stored in the return address segment 120. The EBP of the parent function's stack frame (pointing to the local variables in the parent function's stack frame), is stored in the caller EBP segment 130. The stack-frame base pointer then permits easy access to data structures passed on the stack, to the return instruction pointer, and to local variables added to the stack by the called procedure. Finally, local variables of the function are stored in the local variables segment 140.

As shown in FIG. 1B, the function may have been defined with a local variable char c[10], and thus on execution a corresponding memory space would be allocated in the local variables segment. If, as is the case with C/C++, the programming language does not automatically constrain data writes to the local variable address to the allocated memory space, and more data is written to the local variable address than the allocated space, the excess data will be written to adjacent segments.

Thus, as shown in FIG. 10, if the C/C++ strcpy function, which does not check the bounds of the string being copied, is used to write a string consisting of 15 'A's followed by "newaddress", for example, to the c[10] stack space, it will fill the local variables segment and overwrite both the called EBP and return address segments. By this method, an attacker may replace the stored return address of the parent function with a new address (indicated figuratively as "newaddress" in this example), and redirect execution of the process upon termination of the child function to malicious code stored elsewhere.

Variants of stack buffer overflow attacks exist including where the attack code is placed below the parameters segment thereby overwriting portions of the parent function stack frame.

Stack buffer overflow attacks of the sorts described above are well-known, and include examples such as the Slammer worm which caused considerable disruption and cost. Efforts have been made, therefore, to develop techniques to address and prevent stack buffer overflow attacks. Some solutions are based on hardware and include chipsets which detect and prevent stack buffer overrun attacks. (See, for example, Dailey Paulson, L., "New Chips Stop Buffer Overflow Attacks", *Computer* (IEEE, 2004), p. 28.)

Other methods are software-based and employ various techniques for detecting and preventing stack buffer overflow bugs. For example, StackGuard™ is a technology that is used as an extension to the GCC compiler to detect and prevent buffer overrun vulnerabilities. (See Cowan, C. et al, "Stackguard: Automatic adaptive detection and preventions of buffer-overflow attacks", *Proc. of the USENIX Security Symposium*, January 1998.) In this solution, a stored return address pointer of a function is protected by adding a value—a "canary"—onto the stack in front or behind the return address, depending on the respective directions of growth of the stack and of strings stored therein. The canary value is copied to another memory location. The copy is compared with the canary on the stack at the time of the function's epilogue. If the canary and the stored copy are not equal, then a buffer overflow condition is identified. If not, then the stack is considered to be intact.

In another solution, Microsoft provides in its C/C++ compiler an option engaged by the flag/GS for protection of the call stack. The protection provided is similar to StackGuard, described above, but adds an additional protection to the frame pointer or old base pointer which was not provided in StackGuard.

In general, both technologies rely on placing canaries between buffers and other sensitive data on the stack so that when an overflow occurs these values will be overwritten indicating a buffer overflow condition. Such methods are sufficient to protect against unintentional buffer overflows as it is highly improbable that any unintentional overwrite of the canary memory space will preserve the value of the canary. Where a buffer overflow vulnerability is being intentionally exploited, however, it remains possible to circumvent these measures by detecting the presence of the canary and configuring the buffer overflow write so as preserve the canary value while nevertheless overwriting the return address.

Another solution is taught by Conover et al. in U.S. Pat. No. 7,272,748. In this solution, a prologue of a function is hooked and a copy of the first state of a stack frame is saved. The function is allowed to complete. An epilogue of the function is hooked in a second state of the stack frame. The first state and second state of the stack frame are compared and a determination is made whether the stack frame is corrupted based on the comparison. If so, the second state of the stack frame is replaced with the saved first state and the function epilogue is allowed to complete. Conover et al. teaches, however, that the stack frame first state is saved to the heap. This method therefore requires special memory management, and thus Conover et al. further teaches the use of a hash table to address the saved stack frame first state on the heap. Moreover, Conover et al. teaches that a copy of the entire stack frame apart from the local variables buffer is desirable.

Another solution is taught by White in U.S. Pat. No. 7,581, 089. In this solution, a second stack is created to store shadow frames containing the return address on a first, normal stack. The second stack is different from the first stack, and has a second stack pointer. The second stack also contains the address on the first stack containing the return address and a user-definable state variable which is used to identify a shadow frame as a return address. Before returning from a subroutine, the two return addresses are compared and if they do not match the second stack is searched down and then up from a matching return address. If there is a match, the shadow is re-synchronized with the first stack by comparing the stored values of the first stack pointer with the first stack pointer and adjusting appropriately the shadow stack pointer. This method addresses only the value of the return pointer on the first stack, however. The method is further vulnerable to the intentional placement of a known return address in a function stack frame different from a present function stack frame for redirection to shell code since the method searches the second stack up and down for a matching address. Unrestricted string writes spanning multiple stack frames therefore remains a feasible buffer vulnerability exploit.

There remains a need, therefore, for improved solutions to protect against stack buffer overflow exploits.

SUMMARY OF THE INVENTION

Improved buffer overflow protection may be achieved by amending a function's stack frame during the function's prologue so as to include an additional value, by storing a duplicate of a portion of the function's stack frame including the additional value as well as other key values on a separate, duplicate stack, and by comparing the respective portions of the duplicate stack and the function stack during the function's epilogue to determine whether any change has been made to the key values in the function's stack frame. If any changes have been made, the key values may be restored from the duplicate stack in order to avoid termination of the process.

A first aspect of the invention comprises a method of protecting a function stack frame on a computer call stack. The function stack frame corresponds to a function. The method comprises the following steps. A prologue of the function is modified wherein, when executed, the prologue performs the steps of: creating in the function stack frame a starting ShadowKEY value, a starting extended base pointer (EBP) value, and a starting return pointer value; and creating a duplicate stack frame on a duplicate stack different from the computer call stack, the duplicate stack frame comprising the starting ShadowKEY value, the starting EBP value, and the starting return pointer value. An epilogue of the function is modified wherein, when executed, the epilogue performs the following steps. A finishing ShadowKEY value, a finishing EBP value, and a finishing return pointer value are fetched from the function stack frame. The starting ShadowKEY value, the starting EBP value, and the starting return pointer value are fetched from the top of the duplicate stack frame. The starting ShadowKEY value, the starting EBP value, and the starting return pointer value are compared to the finishing ShadowKEY value, the finishing EBP value, and the finishing return pointer value, respectively. If any one of the starting ShadowKEY value, the starting EBP value, and the starting return pointer value is unequal to the finishing ShadowKEY value, the finishing EBP value, and the finishing return pointer value, respectively, the finishing ShadowKEY value, the finishing EBP value, and the finishing return pointer value in the function stack frame are replaced with the starting ShadowKEY value, the starting EBP value, and the starting return pointer value, respectively.

In a further aspect, the function prologue is modified during compilation of the function.

In a further aspect, the function epilogue is modified during compilation of the function.

In a further aspect, the starting ShadowKEY value is placed on the function stack frame adjacent a local variables buffer and on a side of the local variables buffer in a direction of growth in memory of strings on the computer call stack.

In a further aspect, the duplicate stack frame is created on a side of the function stack frame opposite a direction of growth in memory of strings on the computer call stack.

In a further aspect, the starting ShadowKEY value, the starting EBP value, and the starting return pointer value are respective DWORD values.

In a further aspect, the starting ShadowKEY value is specified by a caller of the function.

In a further aspect, the comparing comprises comparing the starting ShadowKEY value to the finishing ShadowKEY value, and only if the starting ShadowKEY value is equal to the finishing ShadowKEY value, comparing the starting EBP value to the finishing EBP value, and only if the EBP value is equal to the finishing EBP value, comparing the starting return pointer value to the finishing return pointer value.

In a further aspect, the starting EBP value is placed on the function stack frame on a side of the starting ShadowKEY value in a direction in memory of growth of strings on the computer call stack.

In a further aspect, the starting return pointer value is placed on the function stack frame on a side of the starting ShadowKEY value in a direction in memory of growth of strings on the computer call stack.

A second aspect of the invention comprises a method of protecting a computer call stack from a buffer overflow vulnerability in a computer application. The method comprises performing the method in the first aspect of the invention for each function in the computer application.

A third aspect of the invention comprises a computer program product comprising a computer-readable memory storing instructions executable by a computer to perform the method according to first aspect of the invention, which may include any of the further aspects described above.

In a further aspect, the instructions are included in a compiler, and the method is performed when the compiler is executed to compile a program containing the function.

In a further aspect, the method is further performed for each one of a plurality of further functions contained in the program when the compiler is executed.

In a further aspect, the starting ShadowKEY value is placed on the function stack frame adjacent a local variables buffer and on a side of the local variables buffer in a direction of growth in memory of strings on the computer call stack.

In a further aspect, the duplicate stack frame is created on a side of the function stack frame opposite a direction of growth in memory of strings on the computer call stack.

In a further aspect, the comparing comprises comparing the starting ShadowKEY value to the finishing ShadowKEY value, and only if the starting ShadowKEY value is equal to the finishing ShadowKEY value, comparing the starting EBP value to the finishing EBP value, and only if the EBP value is equal to the finishing EBP value, comparing the starting return pointer value to the finishing return pointer value.

In a further aspect, the starting EBP value is placed on the function stack frame on a side of the starting ShadowKEY value in a direction in memory of growth of strings on the computer call stack.

In a further aspect, the starting return pointer value is placed on the function stack frame on a side of the starting ShadowKEY value in a direction in memory of growth of strings on the computer call stack.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 10 is a schematic diagram of the stack frame of FIG. 1B illustrating a buffer overflow.

DETAILED DESCRIPTION

Improved buffer overflow protection may be achieved by placing a predetermined value, termed herein a ShadowKEY, on a function's call stack frame at a predetermined location, which in one embodiment is between the caller EBP and the local variables segments of the stack frame. Copies of the ShadowKEY, the caller EBP, and the return pointer are pushed onto a duplicate stack which may be located below the function's stack frame in memory, meaning in a direction opposite the growth of strings on the call stack. The prologue of the function may be modified for this purpose. Following execution of the function, but before the function epilogue completes, the current values of the ShadowKEY, caller EBP, and the return pointer on the function stack are read and compared to the copies stored on the duplicate stack. If they are not identical, a corruption is detected. The preserved copies of these values may be copied back to the function stack frame thereby enabling execution of the process to continue.

As discussed above, in the case of the x86 family of instruction set architectures the call stack grows downwardly toward lower memory addresses, while strings grow upwardly toward higher memory addresses. This protocol will be adopted herein for the sake of simplicity of exposition. Accordingly, the following terminology will be adopted herein regarding the relative position or placement of stack frames and segments in the various embodiments: Terms such as "atop", "above", and so forth are intended to designate relative positions in the direction of higher memory addresses and in the direct of string growth, while "beneath", "below", and so forth are intended to designate relative positions in the direction of lower memory addresses and in the direction of call stack growth.

Figure 1:
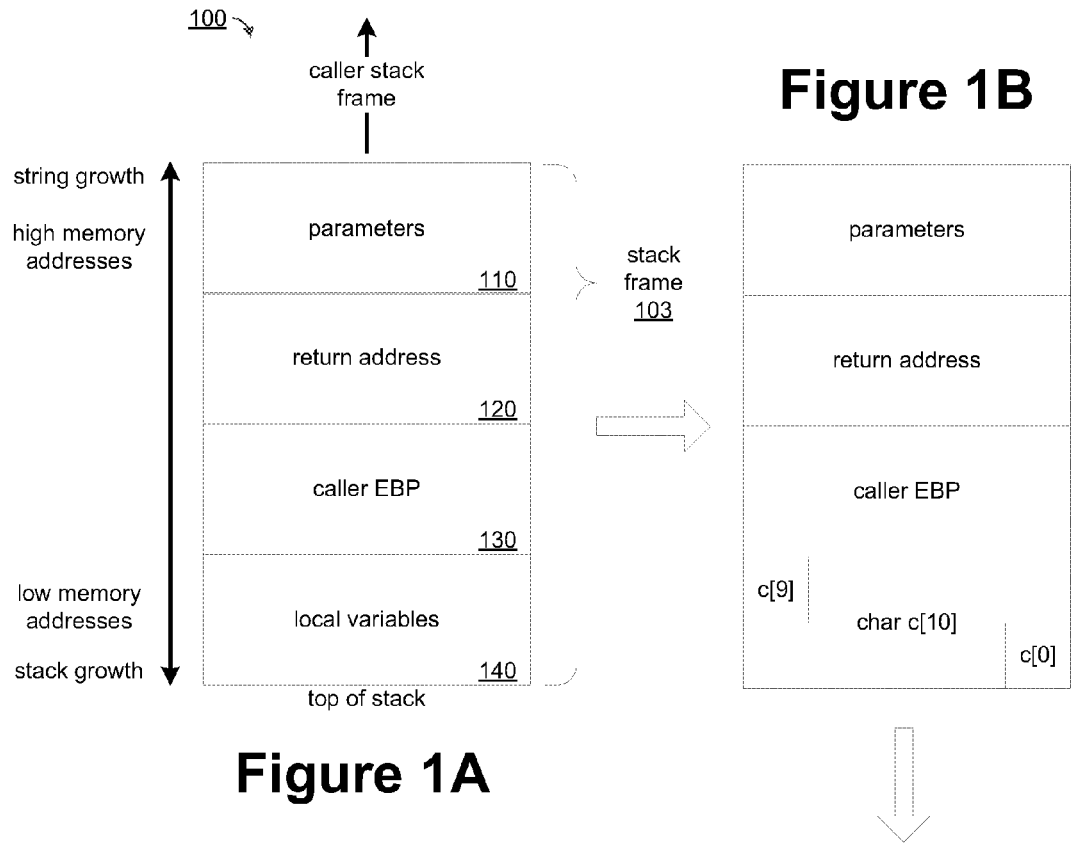
FIG. 1A is a schematic diagram of a known function call stack frame.
FIG. 1B is a schematic diagram of the stack frame of FIG. 1A wherein a variable char c[10] has been defined in the local variables buffer.
Figure 2:
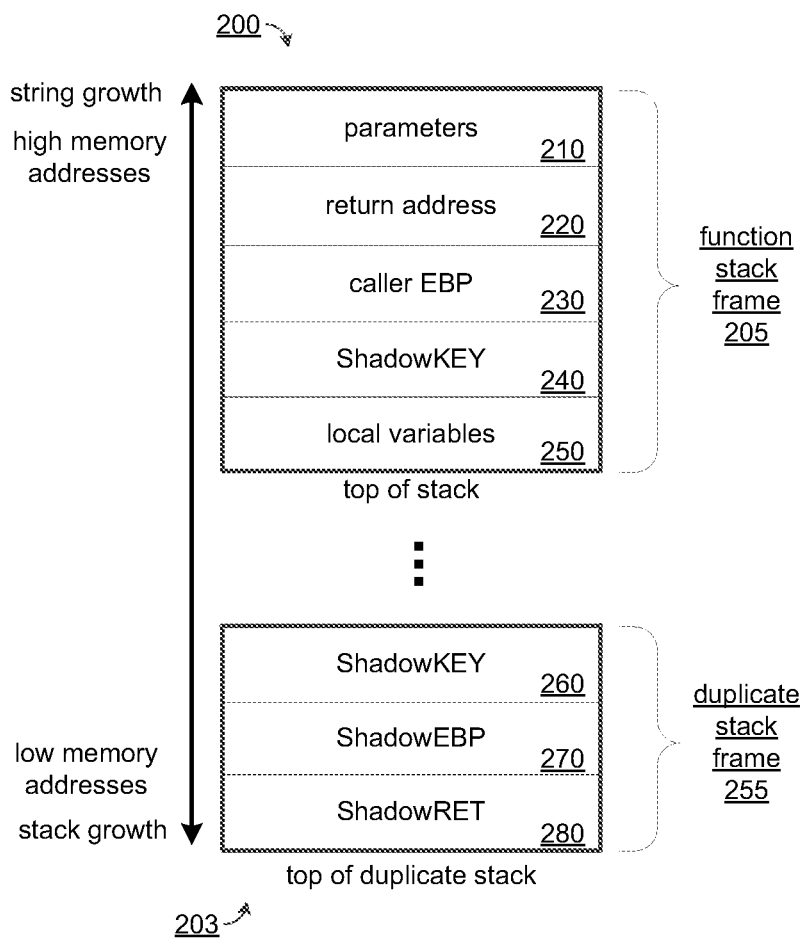
FIG. 2 is a schematic diagram of a function stack frame and a duplicate stack frame according to an embodiment of the invention.
Figure 3:
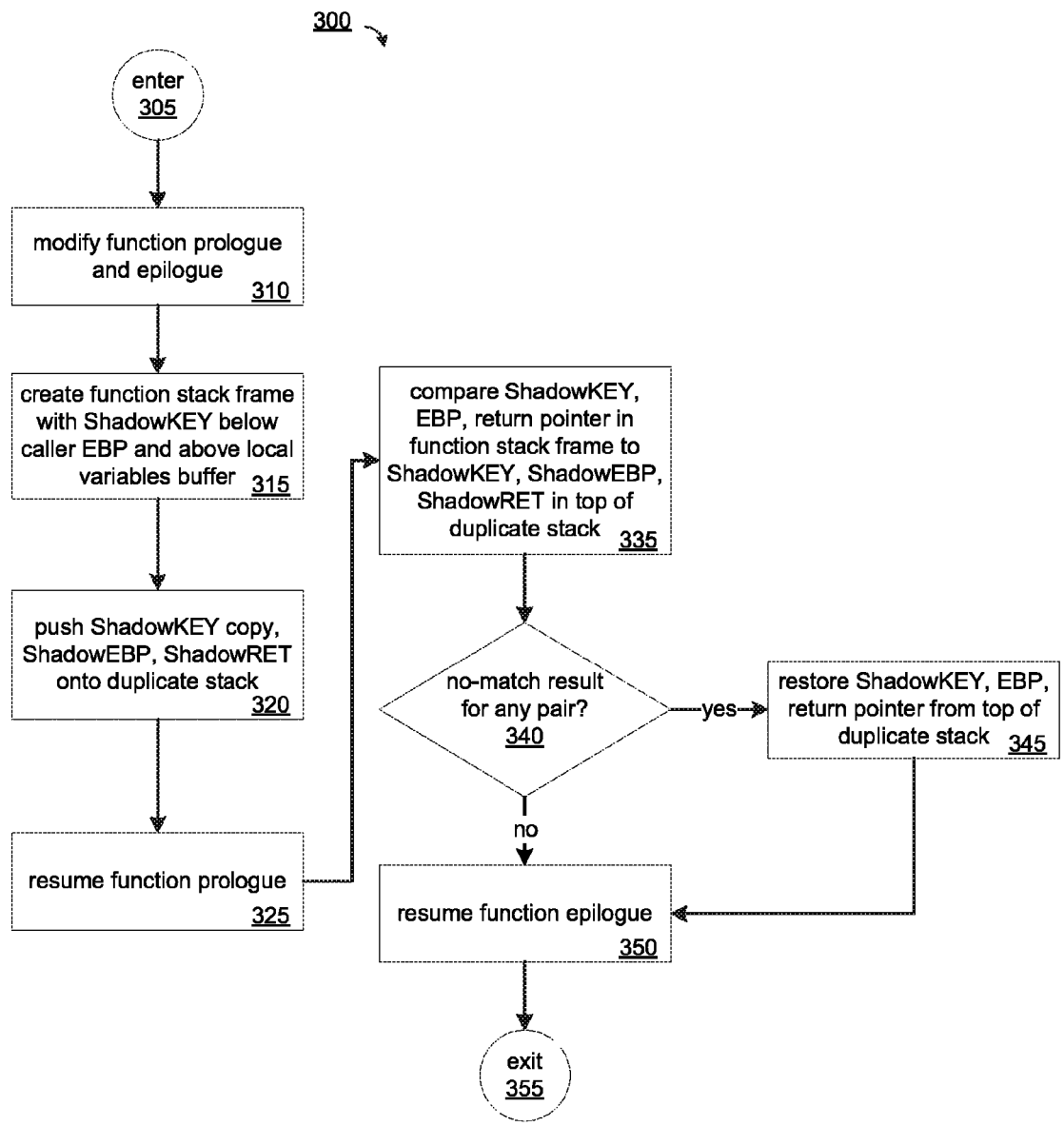
FIG. 3 is a flowchart illustrating a method of protecting a function stack frame according to an embodiment of the invention.

FIG. 2 shows a modified function call stack 200 and duplicate stack 203 providing improved buffer overflow protection. FIG. 3 shows a flowchart illustrating a method 300 for creating and using the modified function call stack 200 and duplicate stack 203.

The method 300 shown in FIG. 3 is entered (step 305) when a function is called. The function's call stack frame is created in the usual way, except a predetermined ShadowKEY value is placed in a predetermined position in the stack frame (step 315). In one embodiment, the ShadowKEY is preselected, while in another embodiment it is determined or otherwise provided by the calling process during execution.

In one embodiment, with reference to FIG. 2, the ShadowKEY 240 is placed above, which may be immediately above, the local variables buffer 250. The function stack frame 205 may include other segments as are known in the art, such as an exception handler frame and save registers (not shown). Copies of the ShadowKEY 240, old caller EBP 230, and return pointer address 220 are then pushed onto a duplicate stack frame 255 (step 320) in the duplicate stack 203. In one embodiment, the duplicate stack 203 is located below the function stack 200 in memory. (The ellipsis in FIG. 2 illustrates a variable separation in memory between the call stack 200 and the duplicate stack 203.) Generally, the duplicate stack 203 will not overlap the function stack 200.

As shown in FIG. 2, the copy of the ShadowKEY 260 may be pushed onto the duplicate stack 203 first, followed by the copy of the old caller EBP, termed the ShadowEBP 270, followed by the copy of the caller return pointer, termed the ShadowRET 280. Other arrangements are employed in other embodiments. Once the function stack frame 205 and duplicate stack frame 255 are thus prepared, execution of the function prologue may resume (step 325) and complete, and execution of the function body proceeds.

The ShadowKEY 260, ShadowEBP 270, and ShadowRET 280 may be any suitable data structures, and in one embodiment are DWORD values.

In order to provide the ShadowKEY 240 in the function's stack frame 205, and to provide the duplicate stack frame 255, the function's prologue code may be modified with suitable instructions (step 310). Such modification may occur at any time prior to the execution of the function such that the modified function stack frame and duplicate stack result. For example, the function prologue code may be modified at the time of compilation of the function. In such case, the function's epilogue may be modified at the same time, according to the requirements described below. The prologue code which executes when the function is called is configured to prepare the function stack frame and duplicate stack frame as shown in FIG. 2.

In one embodiment, the function's prologue is modified according to the following pseudocode:

1: Do Standard Prologue in a Windows process.

2: MOV the ShadowKEY's value onto the current stack.

3: COPY the value of the frame pointer in [ShadowKEY's Address+4]

4: COPY the value of a return address in [ShadowKEY's Address+8]

Following execution of the function body, the current values of the ShadowKEY, the caller EBP, and the return pointer on the function call stack frame are compared respectively to the ShadowKEY, ShadowEBP, and ShadowRET on the duplicate stack frame (step 335). This comparison may proceed in any convenient way, and may including fetching the ShadowKEY, the EBP, and the return pointer from the function call stack on the one hand, and fetching the ShadowKEY, the ShadowEBP, and the ShadowRET from the duplicate stack on the other hand. In one embodiment the ShadowKEYs are compared first, followed by the EBP and ShadowEBP, followed by the return pointer and ShadowRET. If any one of these comparisons results in a no-match result (the compared values are unequal) (decision 340), the comparison stops (no further comparisons are performed, if any remain) and a fix routine is performed. In one embodiment, the fix routine copies the ShadowKEY, the ShadowEBP, and the ShadowRET from the duplicate stack frame into the ShadowKEY, EBP, and return pointer segments of the function stack frame (step 345).

In order to make the above comparison and perform the fix routine if corruption of the function stack frame is detected, the function epilogue may be modified with suitable instructions (step 310). As with the function prologue, this modification may occur at any time prior to the execution of the function, and may be performed during the compilation of the function.

In one embodiment, the function's epilogue is modified according to the following pseudocode:

1: POP Registers in Standard Epilogue

2: Fetch the saved return value from the current stack

3: Fetch the frame pointer from the current stack

4: CALL Security_check_shadow_values to do a comparison

5: Move ESP, EBP

6: POP EBP

7: RET

In the above, the Security_check_shadow_values function may be provided according to the following pseudocode:

1: Compare ShadowKEY in the duplicate stack with ShadowKEY in the Stack

2: IF no match THEN DO Fix Routine

3: Compare ShadowEBP in the duplicate stack with the frame pointer on the Stack

4: IF no match THEN DO Fix Routine

5: Compare ShadowRET in the duplicate stack with the saved return address on the Stack 6: IF no match THEN DO Fix Routine

7: RET

8: here is the Fix Routine

ShadowKEY, ShadowEBP, and ShadowRET are copied from the duplicate stack which is a secure segment to the function stack frame.

If no no-match result is returned, or following the completion of the fix routine, the function epilogue resumes (step 350), and the method exits (355).

In this way, when a buffer overflow occurs in the function stack frame, the saved copies of the ShadowKEY, EBP, and return pointer on the duplicate stack are recovered. Termination of the process may be avoided, and instead may be allowed to continue. In particular, by restoring the return pointer to its known, correct value prior to execution of the function, if it has changed in the meantime, any attempt to hijack the process by overwriting the return pointer and redirecting the process to malicious code is prevented.

Figure 4:
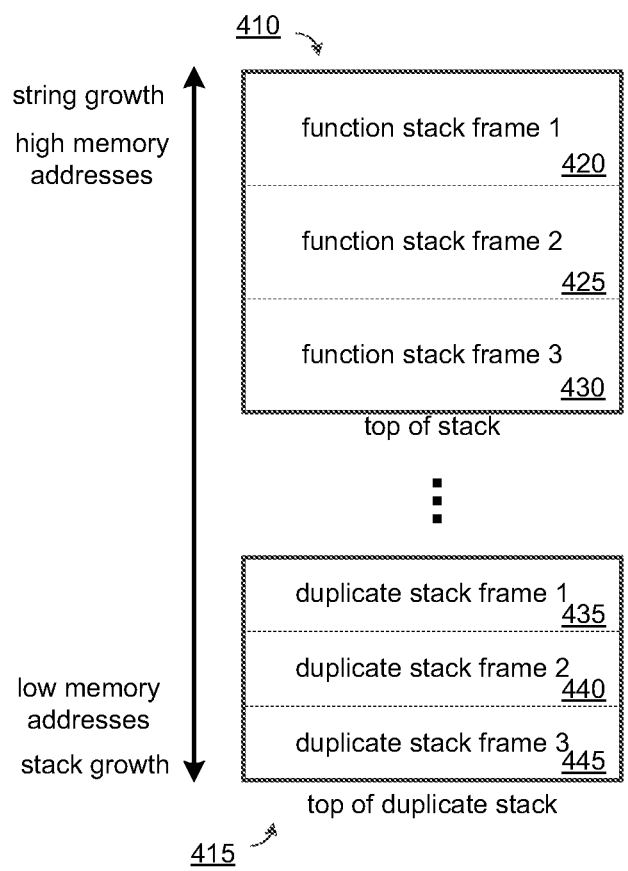
FIG. 4 is a schematic diagram showing function stack frames and duplicate stack frames corresponding to multiple embedded functions according to an embodiment of the invention.

FIG. 4 shows a call stack 410 having multiple embedded function calls such that multiple function stack frames 420, 425, 430 have been pushed onto the call stack 410 at a given time. For each function called, the corresponding function stack frame is modified with a corresponding ShadowKEY and may be implemented generally as the function stack frame 205 shown in FIG. 2. A duplicate stack 415 is also created as described above having a duplicate stack frame 435, 440, 445 corresponding to each function stack frame 420, 425, 430 in the call stack 410, and each duplicate stack frame 430, 440, 445 may be implemented generally as the duplicate stack frame 255 shown in FIG. 2.

Each function stack frame 420, 425, 430 and corresponding duplicate stack frame 435, 440, 445 may be provided and secured according to the method 300 shown in FIG. 3 and described above. It will be appreciate that the performance of an instance of the method 300 in connection with a called function will be contained within the performance of the instance of the method 300 in connection with the calling function. Nevertheless, with respect to any such functions, the method 300 may be performed so as to secure that function's call stack frame.

As shown in FIG. 4, in one embodiment the duplicate stack 415 is placed below the function call stack 410 in memory, and the ellipsis in FIG. 4 illustrates a variable separation in memory between the call stack 410 and the duplicate stack 415. It will be appreciated, therefore, that buffer overflow vulnerabilities in the function call stack 410 cannot be exploited to overwrite the duplicate stack 415 as unrestricted string writes grow in a direction opposite the placement of the duplicate stack 415 in memory. Moreover, since the function stack frame of each embedded function is tested and validated upon the epilogue of each function separately, and only the confirmation of the unmodified values for that particular function, as described above, indicates an uncorrupted stack frame, the call stack is protected from buffer overflow exploits which seek to overwrite values in the other stack frames of calling functions.

While the above embodiments concern a call stack which grows from higher addresses to lower addresses, whereas strings grow from lower addresses to higher addresses, as is the case in the x86 family of instruction set architectures, it will be understood that the methods described herein are also operative for calls stacks which grow oppositely, that is from lower to higher addresses, so long as the principles described above are adhered to.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A method of protecting a function stack frame on a computer call stack, the function stack frame corresponding to a function, the method comprising:
   modifying a prologue of the function wherein, when executed, the prologue performs the steps of:
      creating in the function stack frame a starting ShadowKEY value, a starting extended base pointer (EBP) value, and a starting return pointer value; and
      creating a duplicate stack frame on a duplicate stack different from the computer call stack, the duplicate stack frame comprising the starting ShadowKEY value, the starting EBP value, and the starting return pointer value; and
   modifying an epilogue of the function wherein, when executed, the epilogue performs the steps of:
      fetching from the function stack frame a finishing ShadowKEY value, a finishing EBP value, and a finishing return pointer value;
      fetching from the duplicate stack frame the starting ShadowKEY value, the starting EBP value, and the starting return pointer value;
      comparing the starting ShadowKEY value, the starting EBP value, and the starting return pointer value to the finishing ShadowKEY value, the finishing EBP value, and the finishing return pointer value, respectively; and
      if any one of the starting ShadowKEY value, the starting EBP value, and the starting return pointer value is unequal to the finishing ShadowKEY value, the finishing EBP value, and the finishing return pointer value, respectively, replacing the finishing ShadowKEY value, the finishing EBP value, and the finishing return pointer value in the function stack frame with the starting ShadowKEY value, the starting EBP value, and the starting return pointer value, respectively; and
      wherein the starting ShadowKEY value is pushed onto a duplicate stack which is located below the function's stack frame in memory.

2. A method of protecting a function stack frame on a computer call stack, the function stack frame corresponding to a function, the method comprising:
   modifying a prologue of the function wherein, when executed, the prologue performs the steps of:
      creating in the function stack frame a starting ShadowKEY value, a starting extended base pointer (EBP) value, and a starting return pointer value; and
      creating a duplicate stack frame on a duplicate stack different from the computer call stack, the duplicate stack frame comprising the starting ShadowKEY value, the starting EBP value, and the starting return pointer value; and
   modifying an epilogue of the function wherein, when executed, the epilogue performs the steps of:
      fetching from the function stack frame a finishing ShadowKEY value, a finishing EBP value, and a finishing return pointer value;
      fetching from the duplicate stack frame the starting ShadowKEY value, the starting EBP value, and the starting return pointer value;
      comparing the starting ShadowKEY value, the starting EBP value, and the starting return pointer value to the finishing ShadowKEY value, the finishing EBP value, and the finishing return pointer value, respectively; and
      if any one of the starting ShadowKEY value, the starting EBP value, and the starting return pointer value is unequal to the finishing ShadowKEY value, the finishing EBP value, and the finishing return pointer value, respectively, replacing the finishing ShadowKEY value, the finishing EBP value, and the finishing return pointer value in the function stack frame with the starting ShadowKEY value, the starting EBP value, and the starting return pointer value, respectively; and
      wherein the duplicate stack frame is located below the function's stack frame in memory and comprises copies of a ShadowKEY, a caller EBP, and a return pointer.

3. A method of protecting a function stack frame on a computer call stack, the function stack frame corresponding to a function, the method comprising:
   modifying a prologue of the function wherein, when executed, the prologue performs the steps of:
      creating in the function stack frame a starting ShadowKEY value, a starting extended base pointer (EBP) value, and a starting return pointer value; and
      creating a duplicate stack frame on a duplicate stack different from the computer call stack, the duplicate stack frame comprising the starting ShadowKEY value, the starting EBP value, and the starting return pointer value; and
   modifying an epilogue of the function wherein, when executed, the epilogue performs the steps of:
      fetching from the function stack frame a finishing ShadowKEY value, a finishing EBP value, and a finishing return pointer value;
      fetching from the duplicate stack frame the starting ShadowKEY value, the starting EBP value, and the starting return pointer value;
      comparing the starting ShadowKEY value, the starting EBP value, and the starting return pointer value to the finishing ShadowKEY value, the finishing EBP value, and the finishing return pointer value, respectively; and
      if any one of the starting ShadowKEY value, the starting EBP value, and the starting return pointer value is unequal to the finishing ShadowKEY value, the finishing EBP value, and the finishing return pointer value, respectively, replacing the finishing ShadowKEY value, the finishing EBP value, and the finishing return pointer value in the function stack frame with the starting ShadowKEY value, the starting EBP value, and the starting return pointer value, respectively; and wherein the starting ShadowKEY value is specified between the caller EBP and the local variables segments of the stack frame in the duplicate stack located below the function's stack frame in memory.

4. A method of protecting a function stack frame on a computer call stack, the function stack frame corresponding to a function, the method comprising:

modifying a prologue of the function wherein, when executed, the prologue performs the steps of:
creating in the function stack frame a starting ShadowKEY value, a starting extended base pointer (EBP) value, and a starting return pointer value; and
creating a duplicate stack frame on a duplicate stack different from the computer call stack, the duplicate stack frame comprising the starting ShadowKEY value, the starting EBP value, and the starting return pointer value; and modifying an epilogue of the function wherein, when executed, the epilogue performs the steps of:
fetching from the function stack frame a finishing ShadowKEY value, a finishing EBP value, and a finishing return pointer value;
fetching from the duplicate stack frame the starting ShadowKEY value, the starting EBP value, and the starting return pointer value;
comparing the starting ShadowKEY value, the starting EBP value, and the starting return pointer value to the finishing ShadowKEY value, the finishing EBP value, and the finishing return pointer value, respectively; and
if any one of the starting ShadowKEY value, the starting EBP value, and the starting return pointer value is unequal to the finishing ShadowKEY value, the finishing EBP value, and the finishing return pointer value, respectively, replacing the finishing ShadowKEY value, the finishing EBP value, and the finishing return pointer value in the function stack frame with the starting ShadowKEY value, the starting EBP value, and the starting return pointer value, respectively; and wherein the comparing comprises:
comparing the starting ShadowKEY value in the duplicate Stack to the finishing ShadowKEY value of the function Stack; and
only if the starting ShadowKEY value is equal to the finishing ShadowKEY value: comparing the starting EBP value in the duplicate Stack to the finishing EBP value of the function Stack; and
only if the EBP value is equal to the finishing EBP value:
comparing the starting return pointer value in the duplicate Stack to the finishing return pointer value of the function Stack.

5. A method of protecting a function stack frame on a computer call stack, the function stack frame corresponding to a function, the method comprising:

modifying a prologue of the function wherein, when executed, the prologue performs the steps of:
creating in the function stack frame a starting ShadowKEY value, a starting extended base pointer (EBP) value, and a starting return pointer value; and
creating a duplicate stack frame on a duplicate stack different from the computer call stack, the duplicate stack frame comprising the starting ShadowKEY value, the starting EBP value, and the starting return pointer value; and modifying an epilogue of the function wherein, when executed, the epilogue performs the steps of:
fetching from the function stack frame a finishing ShadowKEY value, a finishing EBP value, and a finishing return pointer value;
fetching from the duplicate stack frame the starting ShadowKEY value, the starting EBP value, and the starting return pointer value;
comparing the starting ShadowKEY value, the starting EBP value, and the starting return pointer value to the finishing ShadowKEY value, the finishing EBP value, and the finishing return pointer value, respectively; and
if any one of the starting ShadowKEY value, the starting EBP value, and the starting return pointer value is unequal to the finishing ShadowKEY value, the finishing EBP value, and the finishing return pointer value, respectively, replacing the finishing ShadowKEY value, the finishing EBP value, and the finishing return pointer value in the function stack frame with the starting ShadowKEY value, the starting EBP value, and the starting return pointer value, respectively; and wherein the starting EBP value is pushed onto a duplicate stack which is located below the function's stack frame in memory after the starting ShadowKEY.

6. A method of protecting a function stack frame on a computer call stack, the function stack frame corresponding to a function, the method comprising:

modifying a prologue of the function wherein, when executed, the prologue performs the steps of:
creating in the function stack frame a starting ShadowKEY value, a starting extended base pointer (EBP) value, and a starting return pointer value; and
creating a duplicate stack frame on a duplicate stack different from the computer call stack, the duplicate stack frame comprising the starting ShadowKEY value, the starting EBP value, and the starting return pointer value; and modifying an epilogue of the function wherein, when executed, the epilogue performs the steps of:
fetching from the function stack frame a finishing ShadowKEY value, a finishing EBP value, and a finishing return pointer value;
fetching from the duplicate stack frame the starting ShadowKEY value, the starting EBP value, and the starting return pointer value;
comparing the starting ShadowKEY value, the starting EBP value, and the starting return pointer value to the finishing ShadowKEY value, the finishing EBP value, and the finishing return pointer value, respectively; and
if any one of the starting ShadowKEY value, the starting EBP value, and the starting return pointer value is unequal to the finishing ShadowKEY value, the finishing EBP value, and the finishing return pointer value, respectively, replacing the finishing ShadowKEY value, the finishing EBP value, and the finishing return pointer value in the function stack frame with the starting ShadowKEY value, the starting EBP value, and the starting return pointer value, respectively; and wherein the starting return pointer value is pushed onto a duplicate stack which is located below the function's stack frame in memory after the starting EBP value.

7. A computer program product comprising a computer-readable memory storing instructions executable by a computer to protect a function stack frame on a computer call stack, the function stack frame corresponding to a function of:
   modifying a prologue of the function wherein, when executed, the prologue performs the steps of:
      creating in the function stack frame a starting ShadowKEY value, a starting extended base pointer (EBP) value, and a starting return pointer value; and
      creating a duplicate stack frame on a duplicate stack different from the computer call stack, the duplicate stack frame comprising the starting ShadowKEY value, the starting EBP value, and the starting return pointer value; and
   modifying an epilogue of the function wherein, when executed, the epilogue performs the steps of:
      fetching from the function stack frame a finishing ShadowKEY value, a finishing EBP value, and a finishing return pointer value;
      fetching from the duplicate stack frame the starting ShadowKEY value, the starting EBP value, and the starting return pointer value;
      comparing the starting ShadowKEY value, the starting EBP value, and the starting return pointer value to the finishing ShadowKEY value, the finishing EBP value, and the finishing return pointer value, respectively; and
      if any one of the starting ShadowKEY value, the starting EBP value, and the starting return pointer value is unequal to the finishing ShadowKEY value, the finishing EBP value, and the finishing return pointer value, respectively, replacing the finishing ShadowKEY value, the finishing EBP value, and the finishing return pointer value in the function stack frame with the starting ShadowKEY value, the starting EBP value, and the starting return pointer value, respectively; and
   wherein the starting ShadowKEY value is pushed onto a duplicate stack which is located below the function's stack frame in memory.

8. A computer program product comprising a computer-readable memory storing instructions executable by a computer to protect a function stack frame on a computer call stack, the function stack frame corresponding to a function of:
   modifying a prologue of the function wherein, when executed, the prologue performs the steps of:
      creating in the function stack frame a starting ShadowKEY value, a starting extended base pointer (EBP) value, and a starting return pointer value; and
      creating a duplicate stack frame on a duplicate stack different from the computer call stack, the duplicate stack frame comprising the starting ShadowKEY value, the starting EBP value, and the starting return pointer value; and
   modifying an epilogue of the function wherein, when executed, the epilogue performs the steps of:
      fetching from the function stack frame a finishing ShadowKEY value, a finishing EBP value, and a finishing return pointer value;
      fetching from the duplicate stack frame the starting ShadowKEY value, the starting EBP value, and the starting return pointer value;
      comparing the starting ShadowKEY value, the starting EBP value, and the starting return pointer value to the finishing ShadowKEY value, the finishing EBP value, and the finishing return pointer value, respectively; and
      if any one of the starting ShadowKEY value, the starting EBP value, and the starting return pointer value is unequal to the finishing ShadowKEY value, the finishing EBP value, and the finishing return pointer value, respectively, replacing the finishing ShadowKEY value, the finishing EBP value, and the finishing return pointer value in the function stack frame with the starting ShadowKEY value, the starting EBP value, and the starting return pointer value, respectively; and
   wherein the duplicate stack frame is located below the function's stack frame in memory and comprises copies of a ShadowKEY, a caller EBP, and a return pointer.

9. A computer program product comprising a computer-readable memory storing instructions executable by a computer to protect a function stack frame on a computer call stack, the function stack frame corresponding to a function of:
   modifying a prologue of the function wherein, when executed, the prologue performs the steps of:
      creating in the function stack frame a starting ShadowKEY value, a starting extended base pointer (EBP) value, and a starting return pointer value; and
      creating a duplicate stack frame on a duplicate stack different from the computer call stack, the duplicate stack frame comprising the starting ShadowKEY value, the starting EBP value, and the starting return pointer value; and
   modifying an epilogue of the function wherein, when executed, the epilogue performs the steps of:
      fetching from the function stack frame a finishing ShadowKEY value, a finishing EBP value, and a finishing return pointer value;
      fetching from the duplicate stack frame the starting ShadowKEY value, the starting EBP value, and the starting return pointer value;
      comparing the starting ShadowKEY value, the starting EBP value, and the starting return pointer value to the finishing ShadowKEY value, the finishing EBP value, and the finishing return pointer value, respectively; and
      if any one of the starting ShadowKEY value, the starting EBP value, and the starting return pointer value is unequal to the finishing ShadowKEY value, the finishing EBP value, and the finishing return pointer value, respectively, replacing the finishing ShadowKEY value, the finishing EBP value, and the finishing return pointer value in the function stack frame with the starting ShadowKEY value, the starting EBP value, and the starting return pointer value, respectively; and
   wherein the comparing comprises:
   comparing the starting ShadowKEY value in the duplicate Stack to the finishing ShadowKEY value of the function Stack; and
   only if the starting ShadowKEY value is equal to the finishing ShadowKEY value: comparing the starting EBP value in the duplicate Stack to the finishing EBP value of the function Stack; and
   only if the EBP value is equal to the finishing EBP value:

comparing the starting return pointer value in the duplicate Stack to the finishing return pointer value of the function Stack.

10. A computer program product comprising a computer-readable memory storing instructions executable by a computer to protect a function stack frame on a computer call stack, the function stack frame corresponding to a function of:
modifying a prologue of the function wherein, when executed, the prologue performs the steps of:
creating in the function stack frame a starting ShadowKEY value, a starting extended base pointer (EBP) value, and a starting return pointer value; and
creating a duplicate stack frame on a duplicate stack different from the computer call stack, the duplicate stack frame comprising the starting ShadowKEY value, the starting EBP value, and the starting return pointer value; and
modifying an epilogue of the function wherein, when executed, the epilogue performs the steps of:
fetching from the function stack frame a finishing ShadowKEY value, a finishing EBP value, and a finishing return pointer value;
fetching from the duplicate stack frame the starting ShadowKEY value, the starting EBP value, and the starting return pointer value;
comparing the starting ShadowKEY value, the starting EBP value, and the starting return pointer value to the finishing ShadowKEY value, the finishing EBP value, and the finishing return pointer value, respectively; and
if any one of the starting ShadowKEY value, the starting EBP value, and the starting return pointer value is unequal to the finishing ShadowKEY value, the finishing EBP value, and the finishing return pointer value, respectively, replacing the finishing ShadowKEY value, the finishing EBP value, and the finishing return pointer value in the function stack frame with the starting ShadowKEY value, the starting EBP value, and the starting return pointer value, respectively; and
wherein the starting EBP value is pushed onto a duplicate stack which is located below the function's stack frame in memory after the starting ShadowKEY.

11. A computer program product comprising a computer-readable memory storing instructions executable by a computer to protect a function stack frame on a computer call stack, the function stack frame corresponding to a function of:
modifying a prologue of the function wherein, when executed, the prologue performs the steps of:
creating in the function stack frame a starting ShadowKEY value, a starting extended base pointer (EBP) value, and a starting return pointer value; and
creating a duplicate stack frame on a duplicate stack different from the computer call stack, the duplicate stack frame comprising the starting ShadowKEY value, the starting EBP value, and the starting return pointer value; and
modifying an epilogue of the function wherein, when executed, the epilogue performs the steps of:
fetching from the function stack frame a finishing ShadowKEY value, a finishing EBP value, and a finishing return pointer value;
fetching from the duplicate stack frame the starting ShadowKEY value, the starting EBP value, and the starting return pointer value;
comparing the starting ShadowKEY value, the starting EBP value, and the starting return pointer value to the finishing ShadowKEY value, the finishing EBP value, and the finishing return pointer value, respectively; and
if any one of the starting ShadowKEY value, the starting EBP value, and the starting return pointer value is unequal to the finishing ShadowKEY value, the finishing EBP value, and the finishing return pointer value, respectively, replacing the finishing ShadowKEY value, the finishing EBP value, and the finishing return pointer value in the function stack frame with the starting ShadowKEY value, the starting EBP value, and the starting return pointer value, respectively; and
wherein the starting return pointer value is pushed onto a duplicate stack which is located below the function's stack frame in memory after the starting EBP value.

* * * * *